US012523783B2

(12) United States Patent
Julien et al.

(10) Patent No.: US 12,523,783 B2
(45) Date of Patent: Jan. 13, 2026

(54) GNSS MEASUREMENT PROCESSING WITH CARRIER PHASE RESIDUAL ERROR MODEL

(71) Applicant: u-blox AG, Thalwil (CH)

(72) Inventors: Olivier Julien, Oberrieden (CH); Ian Sheret, Hitchin (GB); Christopher David Hide, Reigate (GB); Hayden Dorahy, Leatherhead (GB); Roderick Bryant, Conder (AU)

(73) Assignee: u-blox AG, Thalwil (CH)

( * ) Notice: Subject to any disclaimer, the term of this patent is extended or adjusted under 35 U.S.C. 154(b) by 377 days.

(21) Appl. No.: 18/220,557

(22) Filed: Jul. 11, 2023

(65) Prior Publication Data

US 2024/0012162 A1 Jan. 11, 2024

(30) Foreign Application Priority Data

Jul. 11, 2022 (EP) .................................... 22184208

(51) Int. Cl.
*G01S 19/44* (2010.01)
(52) U.S. Cl.
CPC .................................... *G01S 19/44* (2013.01)
(58) Field of Classification Search
CPC ........ G01S 19/44; G01S 13/723; G01S 7/415; G01S 13/003; G01S 13/931
USPC ......... 342/357.27, 357.43, 357.68, 356, 368, 342/385
See application file for complete search history.

(56) References Cited

U.S. PATENT DOCUMENTS

2018/0299562 A1* 10/2018 Green ................... G01S 19/396

FOREIGN PATENT DOCUMENTS

EP 3859397 8/2021

OTHER PUBLICATIONS

Bryant et al., "Road Vehicle Integrity Bound Propagation Using GNSS/IMU/Odometer," Proceedings of the 33rd International Technical Meeting of the Satellite Division of the Institute of Navigation (ION GNSS+ 2020), 2020, pp. 585-611.
Extended Search Report in European Appln. No. 22184208.1, dated Jan. 4, 2023, 10 pages.
(Continued)

*Primary Examiner* — Bo Fan
(74) *Attorney, Agent, or Firm* — Fish & Richardson P.C.

(57) ABSTRACT

A method and apparatus are provided for processing GNSS measurements to infer state information. An example method includes obtaining one or more residual error models for the plurality of GNSS measurements. The one or more residual error models describe a probability distribution of errors in each of the GNSS measurements. The method further includes inferring the state information based on the one or more residual error models. The GNSS measurements include at least one carrier phase measurement. The residual error model for the at least one carrier phase measurement is cyclic, such that errors in carrier phase that are separated by an integer number of cycles are regarded as equivalent. The probability distribution for the at least one carrier phase measurement comprises a function having a continuous first derivative, for example, a continuous first derivative at a phase boundary between successive cycles.

20 Claims, 4 Drawing Sheets

(56) References Cited

OTHER PUBLICATIONS insidegnss.com [Online], "Tight Position Bounding for Automotive Integrity," Jun. 7, 2021, [Retrieved on Jul. 7, 2023], retrieved from: URL<https://insidegnss.com/tight-position-bounding-for-automotive-integrity/>, 26 pages.

Niesen et al., "Satellite Positioning with Large Constellations," Cornell University Library, 2018, 17 pages.

Communication pursuant to Article 94(3) EPC in European Appln. No. 22184208.1, mailed on Nov. 12, 2024, 8 pages.

Cramer et al., "The bit error probability performance for a digital PLL based MPSK demodulator," Paper, Presented at IEEE MILCOM '91 Conference, McLean, VA, Nov. 4-7, 1991, 6 pages.

* cited by examiner

GNSS MEASUREMENT PROCESSING WITH CARRIER PHASE RESIDUAL ERROR MODEL

CROSS-REFERENCE TO RELATED APPLICATIONS

This application claims priority to European Application No. 22184208.1, filed on Jul. 11, 2022, the contents of which are incorporated herein by reference in their entirety.

FIELD OF THE INVENTION

The present invention relates to Global Navigation Satellite Systems (GNSS). In particular, it relates to a method and apparatus for processing GNSS measurements to infer state information.

BACKGROUND OF THE INVENTION

Techniques for GNSS positioning are well known in the art. Existing GNSS include the Global Positioning System (GPS), Galileo, GLONASS, and BeiDou Navigation Satellite System (BDS), also referred to herein simply as "BeiDou". Each GNSS comprises a constellation of satellites, also known in the art as "space vehicles" (SVs), which orbit the earth. Typically, each SV transmits a number of satellite signals. These are received by a GNSS receiver, for which it is desired to calculate state information, such as a navigation solution. The GNSS receiver can generate a number of ranging and/or Doppler measurements using the signals, to derive information about the distance between the receiver and respective satellites (and/or the rate of change of these distances). When a sufficient number of measurements can be made, the receiver's position and/or velocity can then be calculated.

Various effects can introduce errors into the measurements. In turn, errors in the measurements can lead to errors in the resulting state estimate. Sources of error include, for example, multipath interference. This may be a particular problem for navigation systems of road vehicles. In the signal environments commonly encountered by road vehicles, multipath interference can be caused by reflection or occlusion of satellite signals by other vehicles, or by buildings or vegetation.

Other sources of error include variations in atmospheric delay, as the satellite signals pass through the troposphere or ionosphere. In addition to such "innocent" sources of error, there may be malicious interference, such as jamming or spoofing signals. Jamming signals are transmitted with the deliberate aim to prevent a GNSS receiver from receiving satellite signals successfully. Spoofing involves transmitting a signal that emulates a real satellite signal, with the intention that a GNSS receiver will mistakenly acquire and track the spoofed signal. This can be used by an attacker to deliberately introduce false information into the multilateration calculation, leading to a false position or velocity estimate.

Obviously, it would be desirable to calculate a state estimate as accurately as possible in spite of all of these sources of error. However, it is inevitable that they will sometimes cause the state estimate to be inaccurate. It is desirable to know whether a state estimate is accurate or not—and to quantify the expected accuracy. For example, in autonomous driving applications, it is very important to be able to determine when the uncertainty in the vehicle position is too great for the position estimate to be used safely to control navigation of the vehicle.

In this context, the concept of an "alert limit" or "alarm limit" is sometimes used. This may be defined as the maximum allowable error (for example, error in position) that can be permitted without triggering a hazardous situation.

The concept of "integrity risk" is also used. This may be defined as the probability that the actual position error exceeds the alert limit without any alert flags at a given moment in time. The integrity risk thus describes the level of trust or confidence in the GNSS position estimate.

The uncertainty associated with a position estimate may be quantified in terms of a "protection level". This is defined as a statistical error bound, computed such that the probability of the position error exceeding the bound is less than or equal to a target integrity risk. The protection level may be provided in terms of a radius, in which case the protection level defines a circle in which there is a (quantifiably) high probability of the vehicle being located. A protection level can be used in conjunction with an alert limit, to alert a user of a navigation application, or to trigger other mitigating actions in an automated system. Whenever the protection level exceeds the alert limit, the system alerts the user or takes the necessary mitigating actions, as appropriate. There is, however, always a small risk that the position estimate deviates from the true position by more than the reported protection level. One of the aims of an integrity monitoring system is to minimise this risk by estimating the position or error bound—for example, the protection level—as reliably as possible.

EP 3 859 397 A1 discloses a method for determining a protection level of a position estimate using a single epoch of GNSS measurements. The method includes: specifying a prior probability density $P(x)$ of a state x; specifying a system model $h(x)$ that relates the state x to observables z of the measurements; quantifying quality indicators q associated with the measurements; specifying a non-Gaussian residual error probability density model $f(r|\theta, q)$ and fitting model parameters $\theta$ using experimental data; and defining a posterior probability density $P(x|z, q, \theta)$; estimating the state x; and computing the protection level by integrating the posterior probability density $P(x|z, q, \theta)$ over the state x. EP 3 859 397 A1 proposes the particular example of Student's T-distribution, as the non-Gaussian residual error probability density model.

SUMMARY OF THE INVENTION

As explained above, it is desirable to ensure the integrity of the navigation solution by computing reliable error bounds that are sufficiently tight to provide a high availability of the system. More generally, it is desirable to infer state information as accurately as possible from GNSS measurements. A key aspect in achieving these goals is to model the probability density function of errors as accurately as possible in the set of GNSS measurements that are used to infer the state information. Errors in the modelling of the probability density function are likely to give rise to errors in the resulting inferred state information. Errors in bounds on states may manifest themselves either in unduly high confidence or in unduly low confidence in the state information. Both types of error may be problematic in their own ways. For example, if too low an estimate is provided for the protection level, there is an increased risk that the true error exceeds an alarm limit without the system realising it.

Conversely, if too high an estimate is provided for the protection level, the system may give too many false alarms.

The present inventors have recognised that improvements in the modelling of the residual error distributions of GNSS measurements can therefore improve the accuracy with which error bounds (and other state information) is estimated.

According to an aspect of the present disclosure there is provided a method of processing a plurality of GNSS measurements to infer state information, the method comprising:

obtaining the plurality of GNSS measurements;
obtaining one or more residual error models for the plurality of GNSS measurements, the one or more residual error models describing a probability distribution of errors in each of the GNSS measurements; and
inferring the state information based on the one or more residual error models,
wherein the plurality of GNSS measurements includes at least one carrier phase measurement,
wherein the residual error model for the at least one carrier phase measurement models an error in the carrier phase and is cyclic, such that errors in carrier phase that are separated by an integer number of cycles are regarded as equivalent according to the probability distribution, and
wherein the probability distribution for the at least one carrier phase measurement comprises a function having a continuous first derivative, including a continuous first derivative at a phase boundary between successive cycles.

A single residual error model may describe a probability distribution of one or more of the GNSS measurements. That is, the error in one GNSS measurement may be modelled as a univariate distribution, or the errors in two or more GNSS measurements may be modelled jointly as a multivariate distribution. Each GNSS measurement is modelled by one of the (one or more) residual error models. The number of residual error models is therefore less than or equal to the number of GNSS measurements. At one extreme, each GNSS measurement could be modelled by a separate (univariate) residual error model. At the other extreme, all GNSS measurements could be modelled together by a single (multivariate) residual error model.

Of specific interest, for the present disclosure, is the residual error model that describes the probability distribution of errors in the carrier phase measurement (or, if there is more than one carrier phase measurement, the one or more residual error models that describe the probability distribution of errors in those carrier phase measurements). In various places, the present summary refers to the "at least one" carrier phase measurement in the singular, for simplicity and generality. However, it should be understood that typically there will be multiple such carrier phase measurements, associated with different GNSS signals.

The residual error model(s) may be generated in advance for use in the inference method. The residual error model(s) may be generated from empirical data, comprising GNSS measurements, quality indicators associated with those GNSS measurements, and residual errors associated with those GNSS measurements. Collectively, these may be referred to as empirical or training data.

The function defining the probability distribution for the carrier phase error has a continuous first derivative at all points over the domain of the function—that is, at all values of carrier phase error. In particular, it is continuous at a boundary or phase-wrapping point, where one cycle runs into the next. In residual error models that were used previously, the function used to model the carrier phase error was not cyclic and there was a discontinuity at the wrapping-point or phase-boundary. Use of a function with a continuous first derivative can allow greater flexibility in the choice of numerical methods used to process the residual error model. In particular, it may be possible to process the function using more efficient numerical analysis techniques than if the function had discontinuities in its first derivative.

The probability distribution may model the error in the fractional part of the carrier phase over a domain of −0.5 cycles to +0.5 cycles. In this case, the wrapping point (phase boundary) is at −0.5 cycles (or equivalently +0.5 cycles, since they are the same point, according to the cyclic model).

Inferring the state information may comprise one or both of: calculating an estimate of a state vector based on the plurality of GNSS measurements; and calculating state bounds for the state vector based on the plurality of GNSS measurements.

The state vector includes a plurality of state variables. The state variables may include position variables. They may also include velocity and/or time variables.

The state bounds for the state vector define probabilistic bounds on the range of each of the state variables. In some cases, bounds may be calculated for state variables (for example, position variables) in addition to estimating the state variables themselves. In other cases, the bounds may be calculated without estimating the state variables themselves.

Inferring the state information may comprise evaluating a posterior probability distribution of the state variables. For example, calculating an estimate of a state vector may comprise calculating a maximum likelihood estimate of the state variables. Similarly, calculating the state bounds may comprise evaluating a posterior probability distribution of the state variables to calculate bounds on those variables.

The method may further comprise obtaining, for each of the GNSS measurements, one or more quality indicators associated with that GNSS measurement, wherein the probability distribution for that GNSS measurement depends on the one or more quality indicators.

Here, stating that the probability distribution for each residual error (for each GNSS measurement) "depends on" the one or more quality indicators means that, for different values of the quality indicator(s), the probability distribution for the residual error according to the model will be different. In the terminology of statistics, the probability distribution of the error is conditioned on the quality indicator(s).

Each quality indicator may be indicative of (for example, may quantify or correlate with) signal distortion of GNSS satellite signals received by a GNSS receiver. The quality indicators may be derived from analysis of the received GNSS signals.

The one or more quality indicators may comprise one or both of: (i) a carrier-to-noise density ratio of the GNSS signal on which the respective GNSS measurement was made; and (ii) a window-based quality indicator, based on gathering similar GNSS measurements in a time window around (that is, containing) an epoch of interest—or near to the epoch of interest—and determining a deviation of the respective GNSS measurement at the epoch of interest from a consensus among the gathered GNSS measurements. Calculating the window-based quality indicator may comprise: gathering similar GNSS measurements at a plurality of epochs in the time window; determining a change in the GNSS measurements; identifying a consensus solution for a change in position and clock bias; and calculating the window-based quality indicator based on a deviation of the GNSS measurement from the consensus. In some examples, the epoch of interest may be outside the window but near to it—for example, the epoch of interest may be within 10, 5, 3, or 2 epochs of the window, or may be the epoch immediately before or after the epochs of the window. In other examples, the epoch of interest may be inside the window. This may be advantageous because an epoch inside the window has a greater likelihood of being consistent with the other measurements in the window, if the measurement is of good quality. In particular, in some examples, the epoch of interest may be the last epoch in the window. This may offer an advantage in that the latency of the window-based calculations can be minimised—the consensus within the window (and the deviation of the epoch of interest from it) can be determined immediately without waiting for any further epochs to complete the window.

According to an aspect not presently claimed, there is disclosed a method for quantifying quality of a GNSS measurement. The method includes: performing the GNSS measurement in a window around an epoch of interest; determining a change in the GNSS measurement; identifying a consensus solution for a change in position and clock bias; and characterizing the quality of the GNSS measurement through deviation from the consensus. The epoch of interest is the latest epoch in the window, or is outside the window but near to the window (in the manner summarised above). The GNSS measurement may comprise at least one of phase measurement, pseudorange measurement, and Doppler measurement.

The probability distribution may be defined by one or more parameters, wherein at least one of the parameters is a function of one or more of the quality indicator(s). That is, a change in the one or more quality indicators changes at least one parameter of the probability distribution.

The one or more parameters may include a parameter controlling a breadth of a peak in the distribution. The parameter may be a standard deviation or variance (or may be equivalent to a standard deviation or variance in its effect on the distribution). This parameter may be a function of one or more of the quality indicators.

The method may further comprise calculating the at least one parameter, wherein the at least one parameter is calculated as a polynomial function of one or more of the quality indicators. In particular, the variation of the parameter may be modelled by a truncated power series—for example, a third order truncated power series.

The residual error model for the at least one carrier phase measurement optionally describes a probability distribution that is multi-modal over a single cycle of carrier phase. For instance, the probability distribution may be bi-modal over a single cycle.

The residual error model for the at least one carrier phase measurement optionally describes a probability distribution comprising: a first peak centred at a carrier phase error of zero; and a second peak centred at a non-zero carrier phase error.

The second peak may be centred at a carrier phase error of one half cycle. This may be the case, in particular, if a data signal is modulated on the GNSS signal using binary phase shift keying (BPSK). Such a distribution can model more accurately the distribution of carrier phase errors in GNSS signals observed in practical applications. Many GNSS signals contain a data signal modulated on the carrier wave using BPSK. This introduces phase shifts of 180° (half a cycle) between successive bit periods. If an error occurs in bit-detection (data bit demodulation), then this introduces an error of half a cycle into the carrier phase estimate for the associated bit-period—a so-called half-cycle carrier phase ambiguity.

The second peak may be associated with a lower probability (lower height) than the first peak, since it is typically expected that detection (demodulation) of a data bit will succeed more often than it will fail. The relative heights of the peaks may be related to the expected bit-error rate and/or possibility of having lost carrier phase tracking—the greater the number of bit-errors expected, or the greater the likelihood of loss of phase lock, the higher the second peak.

Inferring the state information based on the one or more residual error models may comprise determining a protection level of a position estimate based on the one or more residual error models.

Inferring the state information based on the one or more residual error models optionally comprises: calculating a posterior probability density for a state vector, based on the one or more residual error models, wherein the state vector includes position variables; and integrating the posterior probability density with respect to position.

The posterior probability density may be integrated to determine the protection level. Calculating the posterior probability density may comprise multiplying the probability distribution of the errors by a prior probability density of the state vector. The posterior probability density may be calculated based on GNSS measurements from a single measurement epoch.

Integrating the posterior probability density may comprise numerical integration. The numerical integration may be performed using a method that requires an input having a smooth first derivative.

The numerical integration may comprise a Markov chain Monte Carlo (MCMC) method. In some examples the numerical integration may comprise a Hamiltonian Markov chain Monte Carlo method.

Also provided is a computer program comprising computer program code configured to cause one or more processors to perform all the steps of a method as summarised above when said computer program is run on said one or more processors.

The one or more processors may comprise or consist of one or more processors of a GNSS receiver. The computer program may be stored on a computer-readable storage medium (optionally non-transitory).

Further provided is a GNSS receiver comprising:
  a signal processing unit, configured to produce a plurality of GNSS measurements; and
  at least one processor, configured to:
    obtain the plurality of GNSS measurements;
    obtain one or more residual error models for the plurality of GNSS measurements, the one or more residual error models describing a probability distribution of errors in each of the GNSS measurements; and
    infer state information based on the one or more residual error models,
  wherein the plurality of GNSS measurements includes at least one carrier phase measurement,
  wherein the residual error model for the at least one carrier phase measurement models an error in the carrier phase and is cyclic, such that errors in carrier phase that are separated by an integer number of cycles are regarded as equivalent according to the probability distribution, and
  wherein the probability distribution for the at least one carrier phase measurement comprises a function having a continuous first derivative, including a continuous first derivative at a phase boundary between successive cycles.

The GNSS receiver may further comprise an RF front-end. The RF front-end may be configured to receive GNSS signals via an antenna. The signal processing unit may be configured to make GNSS measurements (for example, pseudorange measurements and/or carrier range measurements) on the GNSS signals received by the RF front-end.

BRIEF DESCRIPTION OF THE DRAWINGS

The invention will now be described by way of example with reference to the accompanying drawings, in which.

It should be noted that these figures are diagrammatic and not drawn to scale.

DETAILED DESCRIPTION

Reference will now be made in detail to examples according to the present disclosure, which are illustrated in the accompanying drawings. The described examples should not be construed as being limited to the descriptions given in this section. Other examples may have different forms.

For the understanding of the following description, it is assumed that the reader is familiar with the general principles described in EP 3 859 397 A1 (which is incorporated herein by reference).

Figure 1:
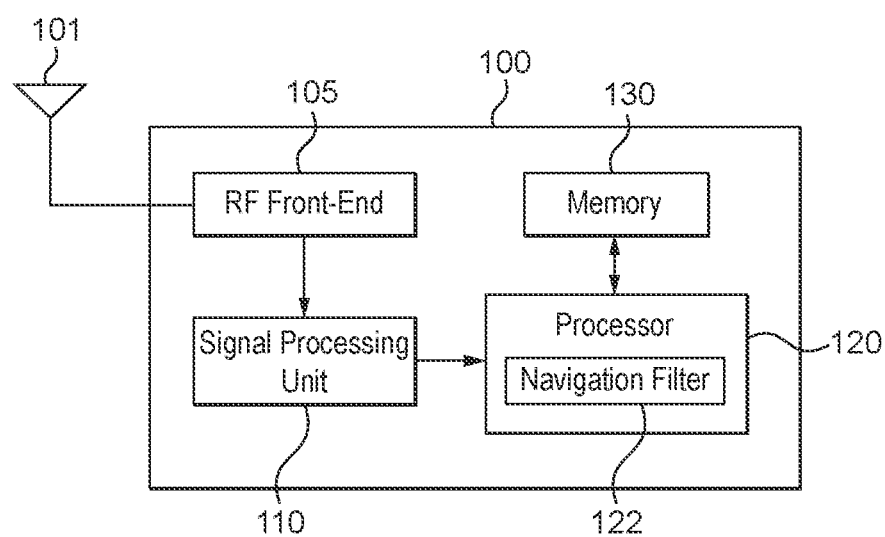
FIG. 1 is a schematic block diagram of a GNSS receiver according to an example.

FIG. 1 is a schematic block diagram of a device according to an example. The device comprises a GNSS antenna 101 and a GNSS receiver 100. The GNSS antenna 101 is configured to receive GNSS signals. It may be configured to receive GNSS signals from a single GNSS constellation (for example, GPS), or it may be configured to receive GNSS signals from multiple constellations (for example, GPS, Galileo, GLONASS, and/or BeiDou). The GNSS receiver 100 comprises an RF front-end 105, a signal processing unit 110, a processor 120, and a memory 130. The RF front-end 105 is configured to receive GNSS signals via the GNSS antenna 101, and to output them to the signal processing unit 110. The RF front-end 105 is configured to down-convert and digitise the satellite signals received via the antenna 101. The RF front-end essentially conditions the signals for subsequent signal processing. Other typical tasks performed by the front-end include filtering and amplification. The satellite signals received at the RF front-end 105 via the antenna 101 include at least one ranging signal, such as a GPS L1 C/A signal, for each of a plurality of satellites. The signal processing unit 110 is configured to track the received GNSS signals—for example, in frequency, delay (code-phase) and carrier phase—and to produce GNSS measurements from the received GNSS signals. It is further configured to generate at least one quality indicator for each GNSS measurement. The processor 120 is configured to process the GNSS measurements obtained from the signal processing unit 110. While it should be understood that more than one processor may be present within the GNSS receiver 100 for implementing methods according to the present disclosure, for the purposes of the present description it is assumed that there is only one processor 120, as depicted in FIG. 1. In the present example, the processor implements a navigation filter 122 as described for the calculation of the single-epoch position bound in EP 3 859 397 A1. At each of a plurality of time increments (epochs), the navigation filter 122 estimates the current value of a state vector of state variables, optionally with their associated uncertainties. In the context of positioning, the state variables estimated by the navigation filter 122 generally include position and time variables, and optionally velocity and other variables. The memory 130 is in communication with the processor 120. The memory 130 is configured to store software/firmware to be executed by the processor 120. The software/firmware is configured to control the processor 120 to carry out a processing method according to an example. The memory may also be configured to store data that is used as input to the processor 120 and/or to store data that is output by the processor 120.

Figure 2:
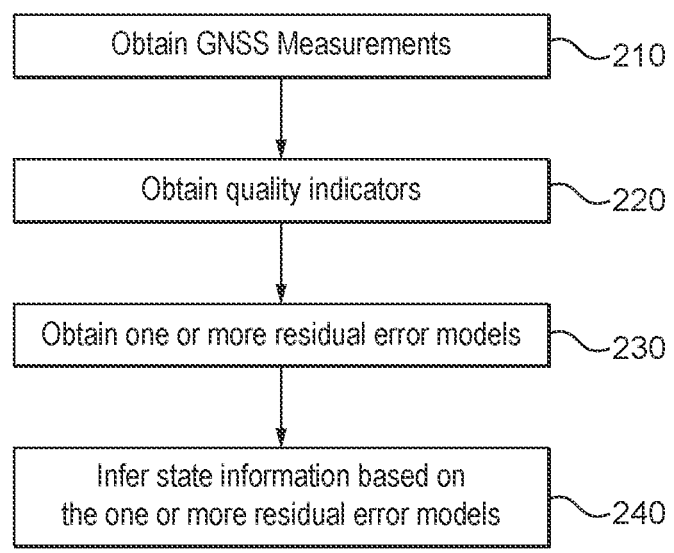
FIG. 2 is a flowchart illustrating a method performed by the GNSS receiver of FIG. 1 according to an example.

FIG. 2 illustrates a method performed by the processor 120 according to an example. In step 210, the processor 120 obtains a plurality of GNSS measurements from the signal processing unit 110. The GNSS measurements are all obtained from the same epoch—that is, they are all made by the signal processing unit 110 at substantially the same time. The GNSS measurements include at least carrier phase measurements. In the present example, they also include pseudorange measurements. Each measurement (be it a pseudorange measurement or a carrier phase measurement) relates to a particular GNSS signal transmitted by a particular satellite. In the present example, the plurality of GNSS measurements include pseudorange and carrier phase measurements for L1 and L2 signals of several GPS satellites. Typically, in order to calculate a position and time solution from the GNSS measurements alone, measurements of four signals from four respective satellites are obtained. In general, the measurements may relate to different satellites of the same constellation or, satellites of different constellations.

As mentioned above, the signal processing unit 110 is configured to provide one or more quality indicators associated with each GNSS measurement. The quality indicators quantify the quality of the measurements (or the GNSS signals on which the measurements are based). In particular, they quantify (or are correlated with) signal distortion. Suitable quality indicators can include but are not limited to: carrier-to-noise power ratio, carrier-to-noise density, carrier-to-noise density variability, carrier phase variance, multipath deviation, loss-of-lock detection, code lock time and phase lock time, satellite elevation, and satellite azimuth.

Measurements do not all have the same error distributions. Some measurements will have broader distributions and/or higher tail probabilities. For instance, measurements with low signal-to-noise density ratio will be noisier, as will measurements from satellites at low elevations. By taking into account effects such as these, examples according to the present disclosure can enable more accurate modelling of the error distributions. According to some examples, the error probability distributions described by the residual error models are conditioned on (that is, are dependent on) a number of quality indicators. Essentially, the quality indicators are predictive of the parameters of the error distribution.

In the present example, two quality indicators are used. The first is the carrier-to-noise density ratio of the GNSS signal from which the GNSS measurement (carrier phase or pseudorange) is derived. This quality indicator is provided by the signal processing unit 110.

The second quality indicator is a window-based quality indicator, which seeks to quantify the extent to which a given measurement is consistent with other measurements in a given time-window. This second quality indicator is calculated by the processor 120. The calculation starts by defining a window around the epoch of interest. The window width is a configurable parameter. The present exemplary implementation uses a half-width of two seconds. The window is symmetric; therefore, it has a full-width of four seconds, and will contain data from five epochs (that is, the number of samples $n_{samples}=5$) assuming an interval of one second between successive epochs. Note that the use of epochs that are after the epoch of interest implies that the algorithm will have a certain latency (equal to the window half width) when implemented in a real-time system. In other examples, the latency could be reduced, if desired, by placing the epoch of interest closer to (or at) the end of the window.

The total number of signals is the sum of the number of signals in the L1 frequency band and the number of signals in the L2 band ($n_{sig}=n_{L1}+n_{L2}$). In order to be included, signals need to be present and have phase lock continuity for all of the epochs in the window. Signals that do not meet these criteria are excluded. The total number of phase measurements is given by $n_{samples} \times (n_{L1}+n_{L2})$. There will be an equal number of pseudorange measurements, making the total number of data points $m=2n_{samples} \times (n_{L1}+n_{L2})$.

These measurements are modelled by a system that represents position and clock bias offsets relative to the first epoch of the window, along with fixed bias terms for phase and pseudorange on each signal. The total number of parameters is therefore $n=4(n_{samples}-1)+2n_{sig}$. This system can be solved as a weighted linear least-squares problem. That is, the m measurements are placed into a column vector y, a column vector x is defined to hold the n free parameters, and an m×n size matrix A defines the linear model y=Ax. A column vector of scaling factors w is defined, one scaling factor for each measurement, with pseudoranges given a scale $1/\sigma_{PR}$ and phases a scale $1/\sigma_{phase}$. For a given state x, the residuals r are:

$r=y-Ax$

The best linear unbiased estimator of the solution $\hat{x}$ is:

$$\hat{x} = \mathrm{argmin}_x \frac{1}{2} \sum_i (w_i r_i)^2$$

This solution can be calculated numerically by transforming the problem into standard form:

$A'=\mathrm{diag}(w)A$, $y'=\mathrm{diag}(w)y$, and solving $(A'^T A)\hat{x}=A'^T y$ for $\hat{x}$.

A refinement is to identify and exclude (or de-weight) outliers, so that their influence on the solution is reduced. This can be done iteratively: calculating a solution; identifying measurements that do not fit the solution; and re-calculating the solution while excluding (or de-weighting) the outlying measurements. This is repeated until convergence. Alternatively, outliers can be identified and excluded using a random sample consensus (RANSAC) technique.

Once the solution has been found and the residuals r have been calculated, the processor 120 calculates the root-mean-square (RMS) of the individual residuals over the time window. This gives a measure of how well (or how poorly) each measurement matches the consensus solution over the time window, which is a useful quality indicator for the measurements. A GNSS measurement that exhibits a low RMS residual value within the time window is likely to be a high quality measurement, since it agrees with the consensus. A GNSS measurement that exhibits a high RMS residual value is likely to be a low quality measurement, since it deviates from the consensus. Such a measurement may have been affected by random noise/interference, or a systematic effect such as multipath, over the time window.

Optionally the quality indicators may be used to exclude signals or measurements from the subsequent analysis. That is, if one or both of the quality indicators indicates that a measurement is of very low quality (very low carrier-to-noise density ratio, or very high window RMS residual) then that measurement (or signal) may be entirely excluded from use in inferring the state information.

As a further optional refinement, epochs at which the GNSS receiver is not moving may be excluded from use in the window-based quality indicator. Non-line-of-sight signals (for example, due to reflections) may exhibit entirely consistent delta phase and delta pseudorange characteristics, when the GNSS receiver is static. However, when the GNSS receiver is moving, the signal ray direction has a significant impact on delta phases and non-line-of-sight signals are detectable because their rays come from the wrong direction. Applying the window-based method only when the GNSS receiver is moving (for example, when its estimated speed is greater than 1 m/s) helps to ensure that these confounding effects of non-line-of-sight signals are reduced or eliminated. However, a side effect is that this particular quality indicator cannot be calculated when the receiver is static. This, in turn, may mean that position bounds cannot be calculated when the receiver is static, according to some examples.

It will be noted that the window-based quality indicator is specific to each individual measurement—a pseudorange measurement and a carrier phase measurement from the same GNSS signal will generally be assigned different values of the window-based quality indicator. In contrast, the first quality indicator (carrier-to-noise density ratio) is the same for both the pseudorange measurement and the carrier phase measurement derived from a given GNSS signal.

In principle, any number of quality indicators could be used to condition the error probability distributions. However, in practice, if too many quality indicators are used, the training data used to estimate the model parameters tends to become too sparse over the multidimensional space of quality indicators. Consequently, it may be beneficial to select a small number of quality indicators that offer the greatest predictive power for the parameters of the error probability distributions. In the present example, as explained above, two quality indicators were chosen, for this reason.

In step 220, the processor 120 obtains the quality indicators (receiving the carrier-to-noise density ratio from the signal processing unit 110, and calculating the window-based quality indicator itself).

In step 230, the processor obtains one or more residual error models, which model the probability distribution of errors in each of the GNSS measurements. According to the present example, the error in each GNSS measurement is modelled separately, as a univariate probability distribution. However, it should be understood that this is not essential. In other examples, some or all of the GNSS measurements may be modelled together in a joint, multivariate probability distribution.

The residual error models are defined in advance and are stored in the memory 130. However, they are conditioned on the quality indicators. In the present example, each residual error model comprises a parametric probability distribution, the parameters of which are directly dependent on the values of the quality indicators.

The residual error model for each pseudorange comprises a Student's T-distribution, as described in EP 3 859 397 A1:

$$f_{pr}(r) = \frac{\Gamma\left(\frac{v+1}{2}\right)}{\sqrt{v\pi\sigma^2}\,\Gamma\left(\frac{v}{2}\right)}\left(1 + \frac{r^2}{\sigma^2 v}\right)^{-\frac{v+1}{2}}$$

Here, r is the residual, v is degrees of freedom parameter, $\sigma$ is a scaling parameter which defines the width of the core distribution, and $\Gamma$ is the gamma function. This distribution allows better modelling of error distributions with heavier tails than a Gaussian (normal) distribution. It has been observed by the inventors that the distribution of real pseudorange errors typically has heavy tails of this kind.

The present inventors have recognised that the carrier phase measurements have specific characteristics, which mean that it can be beneficial to model them using a different form of probability distribution. In a "snapshot" analysis, based on a single epoch, like the present example, only the fractional part of the carrier phase measurement contains meaningful information, because of the unknown integer ambiguity in the number of carrier phase cycles. This fractional part is cyclic, in the sense that adding or subtracting any integer number of cycles returns the same fractional part. It is beneficial for the probability distribution modelling the errors to reflect this—that is, the parametric probability distribution should itself be cyclic. Additionally, for some GNSS signals, there is a potential half-cycle ambiguity, because a data message is modulated on the carrier signal using binary phase shift keying (BPSK). If there is an error in bit-detection, it will lead to (approximately) a half-cycle error in the measured carrier phase.

In order to account for these peculiarities in the distribution of carrier phase errors, the present example uses a probability distribution that is cyclic, and which has a multimodal (in particular, bimodal) distribution. The distribution has a large peak at a carrier phase error of zero cycles, and a smaller peak at a carrier phase error of ±0.5 cycles. The specific parametric distribution used in the present example is as follows:

$$f_{phase}(r) = \frac{1-w}{a}\left(1 + \frac{\sin(r\pi)^2}{(\sigma\pi)^2 v}\right)^{-\frac{v+1}{2}} + \frac{w}{a}\left(1 + \frac{\cos(r\pi)^2}{(\sigma\pi)^2 v}\right)^{-\frac{v+1}{2}}$$

where r is the phase residual, $\sigma$ is the t-distribution scale parameter (controlling the breadth of the peaks), v is the t-distribution degrees-of-freedom parameter, w is the fraction of measurements which have half-cycle errors, and $\alpha$ is a normalisation term, selected to give a total integrated probability of one in the range (−0.5, 0.5) cycles.

The large peak at a carrier phase error of zero cycles models bits that are demodulated correctly. The smaller peak at a carrier phase error of ±0.5 cycles models bits that are demodulated incorrectly. In particular, it models the probability that a bit is demodulated incorrectly despite passing a cyclic redundancy check (CRC). In other words, it models bits in which an error occurs and the system fails to detect or correct this by an error detection/correction code. The smaller peak also models the risk of a loss of carrier phase lock between bit periods, since this can also cause a half-cycle error in the carrier phase measurement.

The model fit is similar to the pseudorange fit, but now with three basic parameters ($\sigma$, v and w). The normalizing constant $\alpha$ can be calculated given the three basic parameters. The variation of a as a function of the quality indicators is modelled using a third order truncated polynomial series:

$$\sigma_i = c_0 + c_1 a_i + c_2 b_i + c_3 a_i^2 + c_4 a_i b_i + c_5 b_i^2 + c_6 a_i^3 + c_7 a_i^2 b_i + c_8 a_i b_i^2 + c_9 b_i^3$$

where $\sigma_i$ is the t-distribution $\sigma$ parameter for the ith sample, $c_0$, $c_1$, etc. are the truncated power series coefficients, $a_i$ is the first quality indicator (carrier to noise density ratio) and $b_i$ is the second quality indicator (phase window RMS). Both v and w are modelled as constants (that is, they do not depend on the quality indicators).

The determination of the truncated power series coefficients is done offline in advance. To gather training data, a GNSS receiver (identical to the one that will use the model) is disposed in a vehicle, and a set of training data is gathered while driving the vehicle around various environments. In general, the greater the variability of signal conditions encountered during the gathering of the training data, the more reliable will be the parameterization of the error distributions. In the present example, measurement residuals were obtained using a real time kinematic (RTK) method, using a local (e.g., within 20 km) reference station and fixing the L1 and the L2 integer ambiguities. This dataset was used for fitting the error model parameters—that is, determining the power series coefficients that map the quality indicators to the t-distribution $\sigma$ parameters. The fitting uses a maximum-likelihood approach. The data included measurements from GPS, BeiDou, Galileo and GLONASS satellites.

Figure 3:
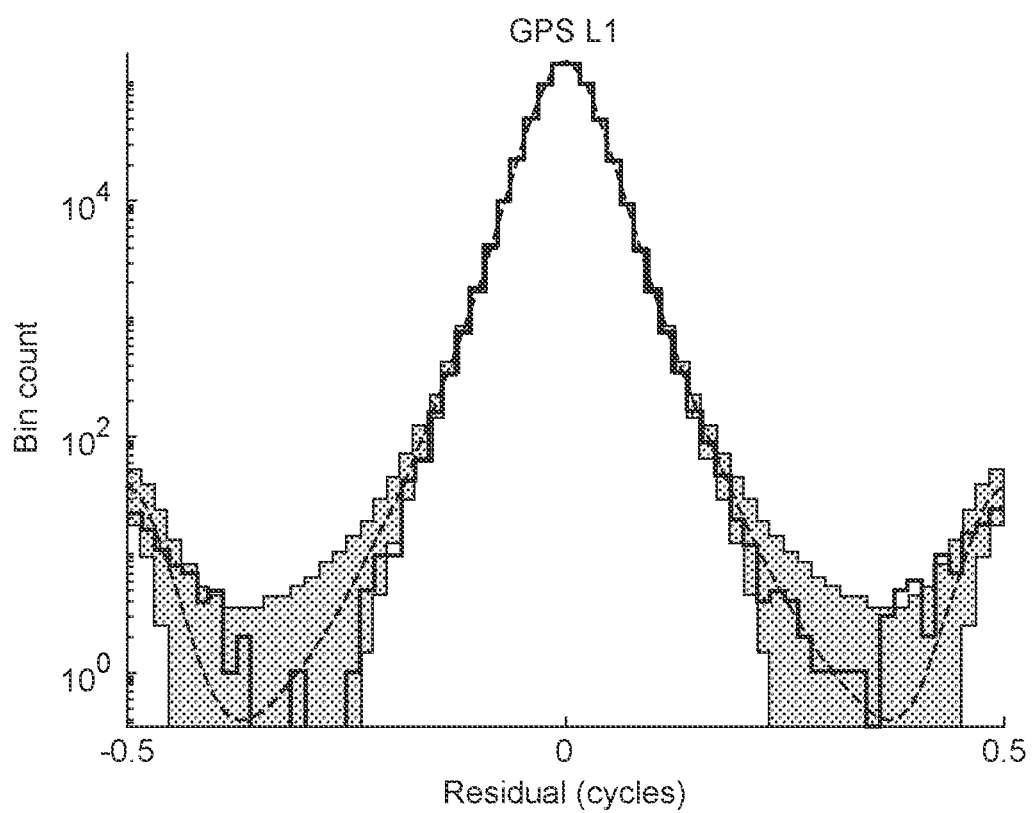
FIG. 3 illustrates a residual error model for a carrier phase measurement, over one cycle, according to an example.

An example of a fit result using the cyclic bimodal probability distribution is shown in FIG. 3. The stepped plot (drawn with a solid black line) shows the empirical density histogram. The dashed curve shows the fitted model according to the parametric distribution above. The shaded area shows the expected deviation from the model due to random sampling variation.

One additional advantage of the parametric distribution described above is that it has a continuous first derivative over its entire domain—including at the wrapping boundary between successive phase cycles. This can lend itself to the use of more efficient and/or computationally less complex numerical integration techniques as discussed in more detail later below.

Figure 4:
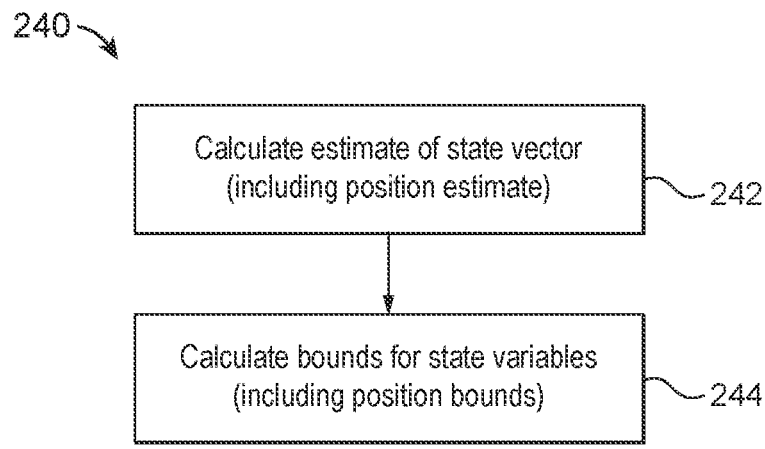
FIG. 4 is a flowchart illustrating one way of inferring state information in the method of FIG. 2.

In step 240, the processor 120 infers state information based on the one or more residual error models. The state information may comprise the values of state variables, or bounds for those state variables, or both. According to the present example, the state information of primary interest is the position of the GNSS receiver and a bound on the position of the GNSS receiver. This position bound is the protection level. A state vector is defined which includes position variables (among other state variables). The step 240 of inferring state information comprises a step 242 of calculating an estimate of the state vector (including an estimate of the position of the GNSS receiver). It further comprises a step 244 of calculating bounds for the state variables (including a position bound—the protection level). These steps are illustrated in FIG. 4.

Figure 5:
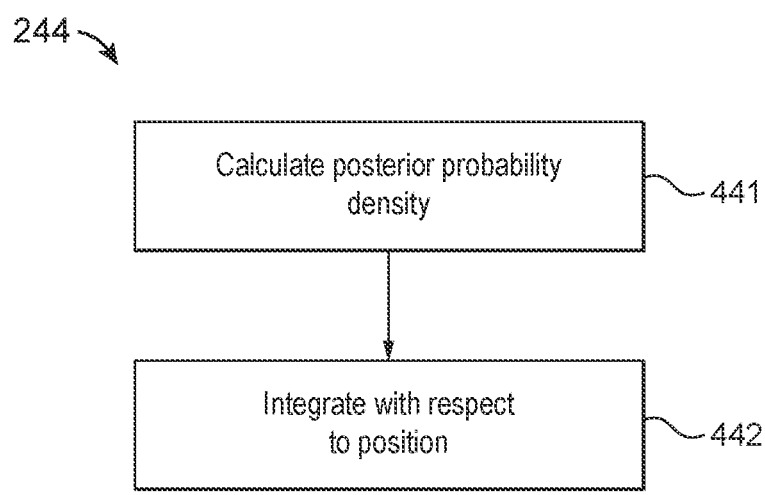
FIG. 5 is a flowchart illustrating the calculation of state bounds, according to an example.

Step 244 comprises two sub-steps, as illustrated in FIG. 5. In a first sub-step 441, the processor 120 obtains a prior probability distribution and combines it with the relevant residual error model, to calculate a posterior probability density. The prior and the error probability distribution are combined by multiplication. This is done for each of the one or more residual error models. In step 442, the processor 120 integrates the posterior probability density that was obtained in step 441, in order to calculate the desired state information (in this case, the protection level).

In the following, it will be described in more detail how the protection level is calculated from the one or more residual error models (in particular, by forming and integrating a posterior probability distribution). It should be understood that the posterior probability distribution can also be used to calculate the position estimate, by finding the maximum of the posterior probability distribution with respect to position. The posterior probability distribution can be used in a similar manner to calculate the maximum likelihood estimates of other state variables. To implement this, the step 242 of calculating the estimate of the state vector can be divided into two steps, just like the step 244 of calculating the bounds. The steps are, firstly, calculating the posterior probability density and, secondly, integrating the posterior probability density to estimate the state variables. If both the state variables and their corresponding bounds are to be estimated in the same way, then this can be done without duplicating the steps shown in FIG. 5. That is, the posterior probability density can be calculated in a single step 441. This step can then be followed by a single integration step (for example, like step 442) applied to the posterior probability density, which calculates both the maximum likelihood estimates and the bounds on those estimates, in one integral. In such an example, it should be understood that steps 242 and 244 of FIG. 4 are effectively performed concurrently.

Determining a protection level from a set of GNSS measurements is a statistical problem that depends on the error probability distribution of the measurements. In the present example, a Bayesian method is used for calculating a posterior probability density (that is, a probability density on position), given a set of known error probability distributions of the measurements. The protection level may then be determined by integrating the posterior probability density. According to the present example, the GNSS measurements are taken from different GNSS signals at the same epoch; this avoids the use of measurements that are correlated in time. The measurements of different GNSS signals at the same epoch can be treated as statistically independent, unlike measurements of the same signal over different epochs. Since the measurements can be treated as statistically independent, it is not necessary to model the errors in a joint distribution. They can be modelled independently by univariate distributions. This makes the posterior probability easier to determine, making it easier to calculate the state information—in particular, the protection level.

When applied to an inference problem given a set of continuous-domain measurements, Bayes formula can be translated into the following equation:

$$P(\text{state} \mid \text{data}) = \frac{P(\text{data} \mid \text{state})P(\text{state})}{P(\text{data})}$$

where P(state|data) is the probability density of a particular state for a given set of observations, P(data|state) is the probability density of a particular set of observations for a given state, P(state) is a prior probability density of the state, and P(data) is the probability density of the set of observations. Information about the state may be inferred from the observables—that is, the GNSS measurements (for example, a pseudorange or a carrier phase). The P(state|data) corresponds to a posterior probability density that needs to be determined in order to compute a protection level of a position estimate. P(data) may be treated as an unknown normalization factor, and can be inferred using the fact that an integral of the posterior probability density P(state|data) over all states equals one. P(data|state) is closely related to the measurement error probability distribution and may be specified by a mathematical model, as discussed below.

According to the present example, the above restatement of Bayes theorem is applied to GNSS measurements. The state vector x includes position variables. It may also include other variables, including but not limited to a clock bias, an instrumental bias, or an atmospheric parameter. The clock bias may include a receiver clock bias and a satellite clock bias. The GNSS measurements are a set of observations, z, including pseudorange measurements and carrier phase measurements. The processor 120 also obtains the quality indicators q (metadata), which indicate information about the quality of the observations.

The set of observations z can be partitioned into two components: a system model h(x) that relates the state x to the observables of the set of observations z, and a random measurement error component (residual) r:

$$z = h(x) + r$$

The system model includes a mathematical model for the carrier phase and a mathematical model for the pseudorange (examples of which are detailed in EP 3 859 397 A1).

The probability density for the residual r is defined by a function $f_{joint}(r|\theta, q)$, which specifies the probability density for a specified set of residuals r, given error model parameters θ and the set of quality indicators q. Returning to Bayes theorem, the posterior probability density P(x|z, q, θ) can be expressed as:

$$P(x \mid z, q, \theta) = \frac{P(z \mid x, q, \theta)P(x)}{P(z \mid q, \theta)}$$

Taking the denominator P(z|q, θ) to be an unknown normalization constant, and r=z−h(x), the posterior probability density P(x|z, q, θ) can be expressed as follows:

$$P(x|z,q,\theta) \propto P(z|x,q,\theta)P(x)$$

$$P(x|z,q,\theta) \propto f_{joint}(z-h(x)|\theta,q)P(x)$$

As explained above, in determining the posterior probability density P(x|z, q, θ), the observables from a single measurement epoch are considered. For a single measurement epoch, since there is no time correlation between the measurements, the measurements can be considered as independent. Thus, the joint probability density $f_{joint}(r|\theta, q)$ can be calculated as a simple product of the independent probability density $f(r|\theta, q)$ of each observation:

$$f_{joint}(z - h(x) | \theta, q) = \prod_i f(z_i - h_i(x) | \theta, q_i)$$

Thus, the definition of the posterior probability density can be simplified as follows:

$$P(x | z, q, \theta) \propto P(x) \prod_i f(z_i - h_i(x) | \theta, q_i)$$

In this way, the measurement error distribution is simplified to a one dimensional function $f(r|\theta, q)$ of the residual r, and this error distribution may be determined using experimental data. A protection level of a position estimate may be further determined from the posterior probability density $P(x|z, q, \theta)$, by integrating the posterior probability density $P(x|z, q, \theta)$ over the state x.

The integration may be done numerically, for example, using Markov chain Monte Carlo (MCMC). In the present example, a Hamiltonian MCMC method is used for the numerical integration. The use of MCMC methods takes advantage of the continuous first derivative in the error probability distribution for each carrier phase measurement (discussed previously above). Further details of suitable numerical integration strategies are provided in EP 3 859 397 A1.

Examples disclosed herein have one or more technical effects. By considering observables from only a single epoch of GNSS measurements, a major source of non-independence (namely, time correlation) is removed and the error distribution on each signal is modelled individually as a one-dimensional probability density function, leading to fast and rigorous determination of a protection level. Using a non-Gaussian error probability density model allows for proper consideration of the tail probability density, thereby ensuring accuracy of the process. Excluding or de-weighting the outliers of the measurements allows for enhanced accuracy and consistency of the determination. Using a cyclic probability density model for the carrier phase measurements enables more faithful modelling of the error distributions for these measurements. The use of a bimodal parametric distribution helps ensure faithful modelling of the errors for data-carrying GNSS signals, without a significant increase in computational complexity. The use of a parametric distribution having a continuous first derivative also helps to moderate the computational complexity of the implementation, by facilitating the use of computationally efficient numerical integration methods.

It should be understood that the scope of the present disclosure is not limited to the examples described above. Many variations will be apparent to those skilled in the art, based on the foregoing description.

For instance, it is not essential that all of the error distributions are conditioned on the quality indicators. In some examples, a residual error model may define a distribution that describes the probability of errors independently of the quality indicators. This may simplify the task of gathering the training data and estimating the model parameters, since less data may be required to fit parameters to a single marginal distribution (as compared with the amount of data required to fit parameters conditioned on the quality indicators).

It should be understood that the specific parametric distributions used in the examples above are not limiting. Those skilled in the art may select other distributions (parametric or non-parametric) that have the general characteristics explained above. For example, other parametric distributions could be selected or designed, which have cyclic behaviour and continuous first derivatives. Optionally they may also have a multimodal (for example, bimodal) structure.

In the event that it is desired to model carrier phase errors in data-carrying GNSS signals that use a modulation scheme other than BPSK, the bimodal structure discussed above might not be optimal. For example, if a GNSS signal were modulated using quadrature phase shift keying (QPSK), the errors caused by imperfect bit-detection may cluster into increments of one-quarter cycle. In this case, a multimodal distribution with four peaks (at −0.25 cycles, 0 cycles, +0.25 cycles and ±0.5 cycles) may provide a better model of the residual error.

In the specific parametric distribution described above and illustrated in FIG. 3, a single t-distribution scale parameter σ is used to parameterize both peaks in the distribution. This is not essential (although it has been found to produce good results). The breadth of each peak could be parameterized separately, by a model like the following:

$$f_{phase}(r) = \frac{1-w}{a}\left(1 + \frac{\sin(r\pi)^2}{(\sigma_0 \pi)^2 v}\right)^{-\frac{v+1}{2}} + \frac{w}{a}\left(1 + \frac{\cos(r\pi)^2}{(\sigma_{0.5}\pi)^2 v}\right)^{-\frac{v+1}{2}}$$

Here, $\sigma_0$ governs the breadth of the peak at 0 cycles, and $\sigma_{0.5}$ governs the breadth of the peak at ±0.5 cycles. The cost of this more detailed parameterisation is an increase in the number of parameters to estimate from the training data in advance.

As mentioned already above, although the examples have focused largely on the calculation of state bounds (in particular, position bounds in the form of a protection level), the residual error models are useful for calculating state information other than (or in addition to) state bounds. In particular, the residual error models may be useful for calculating maximum-likelihood estimates of the state itself.

In general, in the flowcharts of FIGS. 2, 4, and 5, the arrows between the steps do not necessarily imply a causal relationship between those steps. They merely indicate one exemplary order in which the steps may be performed. Method steps may be carried out in a different order from the exemplary order shown in the drawings. For example, the step 220 of obtaining the quality indicators need not be performed after the step 210 of obtaining the GNSS measurements. Although some quality indicators (such as the window-based quality indicator, described above) are indeed calculated based on the GNSS measurements, other quality indicators are not calculated from the GNSS measurements. Such quality indicators may be calculated before (or at the same time as) the GNSS measurements are obtained.

In the examples described above, there were two quality indicators—namely, the carrier to noise density ratio and a window-based quality indicator. These have been found by the inventors to offer a complementary combination; however, it should be understood that the scope of the present disclosure is not limited exclusively to the use of these two quality indicators.

In the example of the window-based quality indicator described above, the window was symmetric about the epoch of interest. This is not essential. In general, any window that includes the epoch of interest may be used. For example, the latency of the algorithm may be reduced by choosing a window that ends at the epoch of interest. In other examples, the epoch may be near to, but outside, the window.

It should be understood that various components illustrated in FIG. 1 may be implemented in hardware, or software, or a mixture of both. Furthermore, some components may be grouped together in a given implementation or may be implemented separately. In the present implementation, block 105 is implemented entirely in hardware, block 110 is implemented partially in hardware, and the remaining components (downstream in the signal processing chain) are implemented in software. In some examples, the navigation filter 122 may be implemented in a separate software module, running on a separate processor from the processor 120. Other implementations are possible, which divide and distribute the various functions differently between hardware and software, or between different hardware components, software modules and/or processors running the software.

In the claims, any reference signs placed between parentheses shall not be construed as limiting the claim. The word "comprising" does not exclude the presence of elements or steps other than those listed in a claim. However, where the word "comprising" is used, this also discloses as a special case the possibility that the elements or steps listed are exhaustive—that is, the apparatus or method may consist solely of those elements or steps. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, or CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of processing a plurality of Global Navigation Satellite Systems (GNSS) measurements to infer state information, the method comprising:
   obtaining the plurality of GNSS measurements;
   obtaining one or more residual error models for the plurality of GNSS measurements, the one or more residual error models describing a probability distribution of errors in each of the GNSS measurements; and
   inferring the state information based on the one or more residual error models,
   wherein the plurality of GNSS measurements includes at least one carrier phase measurement,
   wherein the residual error model for the at least one carrier phase measurement models an error in the carrier phase and is cyclic, such that errors in carrier phase that are separated by an integer number of cycles are regarded as equivalent according to the probability distribution, and
   wherein the probability distribution for the at least one carrier phase measurement comprises a function having a continuous first derivative, including a continuous first derivative at a phase boundary between successive cycles.

2. The method of claim 1, wherein inferring the state information comprises at least one of:
   calculating an estimate of a state vector based on the plurality of GNSS measurements; or
   calculating state bounds for the state vector based on the plurality of GNSS measurements.

3. The method of claim 1, further comprising obtaining, for each of the GNSS measurements, one or more quality indicators associated with that GNSS measurement, wherein the probability distribution for that GNSS measurement depends on the one or more quality indicators.

4. The method of claim 3, wherein the probability distribution is defined by one or more parameters, wherein at least one of the parameters is a function of one or more of the quality indicators.

5. The method of claim 4, wherein the one or more parameters include a parameter controlling a breadth of a peak in the distribution.

6. The method of claim 4, further comprising calculating the at least one of the parameters, wherein the at least one of the parameters is calculated as a polynomial function of one or more of the quality indicators.

7. The method of claim 1, wherein the residual error model for the at least one carrier phase measurement describes a probability distribution that is multi-modal over a single cycle of carrier phase.

8. The method of claim 1, wherein the residual error model for the at least one carrier phase measurement describes a probability distribution comprising:
a first peak centred at a carrier phase error of zero; and
a second peak centred at a non-zero carrier phase error.

9. The method of claim 1, wherein inferring the state information based on the one or more residual error models comprises determining a protection level of a position estimate based on the one or more residual error models.

10. The method of claim 1, wherein inferring the state information based on the one or more residual error models comprises:
calculating a posterior probability density for a state vector, based on the one or more residual error models, wherein the state vector includes position variables; and
integrating the posterior probability density with respect to position.

11. The method of claim 10, wherein the posterior probability density is calculated based on GNSS measurements from a single measurement epoch.

12. The method of claim 10, wherein integrating the posterior probability density comprises numerical integration.

13. The method of claim 12, wherein the numerical integration comprises a Markov chain Monte Carlo method.

14. One or more tangible, non-transitory, computer-readable media storing instructions that, when executed by one or more processors, cause the one or more processors to perform operations comprising:
obtaining a plurality of Global Navigation Satellite Systems (GNSS) measurements;
obtaining one or more residual error models for the plurality of GNSS measurements, the one or more residual error models describing a probability distribution of errors in each of the GNSS measurements; and
inferring state information based on the one or more residual error models,
wherein the plurality of GNSS measurements includes at least one carrier phase measurement,
wherein the residual error model for the at least one carrier phase measurement models an error in the carrier phase and is cyclic, such that errors in carrier phase that are separated by an integer number of cycles are regarded as equivalent according to the probability distribution, and
wherein the probability distribution for the at least one carrier phase measurement comprises a function having a continuous first derivative, including a continuous first derivative at a phase boundary between successive cycles.

15. A Global Navigation Satellite Systems (GNSS) receiver comprising:
a signal processing unit, configured to produce a plurality of GNSS measurements; and
at least one processor, configured to:
obtain the plurality of GNSS measurements;
obtain one or more residual error models for the plurality of GNSS measurements, the one or more residual error models describing a probability distribution of errors in each of the GNSS measurements; and
infer state information based on the one or more residual error models,
wherein the plurality of GNSS measurements includes at least one carrier phase measurement,
wherein the residual error model for the at least one carrier phase measurement models an error in the carrier phase and is cyclic, such that errors in carrier phase that are separated by an integer number of cycles are regarded as equivalent according to the probability distribution, and
wherein the probability distribution for the at least one carrier phase measurement comprises a function having a continuous first derivative, including a continuous first derivative at a phase boundary between successive cycles.

16. The GNSS receiver of claim 15 wherein the at least one processor is further configured to obtain, for each of the GNSS measurements, one or more quality indicators associated with that GNSS measurement, wherein the probability distribution for that GNSS measurement depends on the one or more quality indicators.

17. The GNSS receiver of claim 16, wherein the probability distribution is defined by one or more parameters, wherein at least one of the parameters is a function of one or more of the quality indicators.

18. The GNSS receiver of claim 17, wherein the one or more parameters include a parameter controlling a breadth of a peak in the distribution.

19. The GNSS receiver of claim 15 wherein the residual error model for the at least one carrier phase measurement describes a probability distribution that is multi-modal over a single cycle of carrier phase.

20. The GNSS receiver of claim 15, wherein the residual error model for the at least one carrier phase measurement describes a probability distribution comprising:
a first peak centred at a carrier phase error of zero; and
a second peak centred at a non-zero carrier phase error.

* * * * *